UNITED STATES PATENT OFFICE.

LOUIS HAAS, OF MANNHEIM, GERMANY, ASSIGNOR TO BADISCHE ANILIN AND SODA FABRIK, OF LUDWIGSHAFEN-ON-THE-RHINE, GERMANY, A CORPORATION OF GERMANY.

SULFURIZED COTTON-DYE AND PROCESS OF MAKING SAME.

SPECIFICATION forming part of Letters Patent No. 718,342, dated January 13, 1903.

Application filed February 11, 1902. Serial No. 93,549. (No specimens.)

*To all whom it may concern:*

Be it known that I, LOUIS HAAS, doctor of science and chemist, a citizen of the French Republic, residing at Mannheim, in the Grand Duchy of Baden, Germany, have invented new and useful Improvements in Sulfurized Cotton-Coloring Matters and Processes of Making the Same, of which the following is a specification.

This invention relates to sulfurized substantive cotton-coloring matter which dyes unmordanted cotton shades which are within the range of from yellow to brown and a process for producing the same. I can arrive at this new coloring-matter by treating with sodium sulfid and sulfur the sodium salts of certain nitration products of benzyl sulfonic acid. Among the nitration products which I have found to be useful for the purposes of this my invention are para-mono-nitro-benzyl-sulfonic acid, the dinitro-benzyl sulfonic acid described by Mohr in *Annalen der Chemie*, Vol. 221, page 225, or mixtures of these two substances, the sodium salts of all of which acids or their equivalents I desire to have hereinafter included in the generic term "nitro-benzyl sulfonic substance."

When the above-described dinitro-benzyl sulfonic acid is employed in my process, a coloring-matter is obtained which can produce a brown shade. If the para-mono-nitro-benzyl sulfonic acid be employed, a coloring-matter is obtained which can produce a yellow shade, and if mixtures of these two acids be employed then the resulting coloring-matter can produce a shade lying within the range of yellow to brown, depending upon the composition of such mixture. The fabric so dyed is not essentially affected in shade when suitably treated in the customary manner with bichromate of potash and acetic acid. When treated with nitrous acid and then with betanaphthol in the manner usual for developing color upon dyed fiber the shades of the dyed fabric all become more reddish in color.

My new coloring-matters are all of them distinguished from all hitherto-known coloring-matters which produce similar shades in that when the aqueous solutions are treated at the boiling-point with an excess of hydrochloric acid containing about ten (10) per cent. of that acid (HCl) they yield a product which I hereinafter regard as the "coloring-matter acid," which coloring-matter acid is not dissolved by a cold ten (10) per cent. aqueous solution of sodium carbonate, and one part of the same is not wholly dissolved within one (1) hour when mixed with ten (10) parts of an aqueous solution of crystallized sodium sulfid, one hundred (100) cubic centimeters of which contain fifty (50) grams of crystallized sodium sulfid, ($Na_2S.9H_2O$.)

In the following example I will further illustrate the nature of this my invention; but I do not consider my invention as limited to the proportions and other conditions therein set forth. The parts are by weight, and the temperature degrees refer to the centigrade scale. As is customary in descriptions of this kind, I will hereinafter employ the term "sodium sulfid" to mean crystallized sodium sulfid, whose chemical formula is accepted generally as $Na_2S.9H_2O$.

*Example—Production of coloring-matter from Mohr's dinitro-benzyl sulfonic acid.*—Introduce while stirring one (1) part of the sodium salt of this dinitro-benzyl sulfonic acid into a solution of one (1) part of sulfur and three (3) parts of sodium sulfid in two (2) parts of water whose temperature is between sixty (60°) and eighty (80°) degrees. Then raise the temperature to between one hundred and fifty (150°) and two hundred (200°) degrees, and maintain it so until the mass has become very nearly solid. Now cool this result and break it up into small lumps and again heat for some time—say about one-half ($\frac{1}{2}$) hour—to a temperature between two hundred and twenty (220°) and two hundred and forty (240°) degrees. The product so obtained is a blackish brittle mass, which dissolves in water, giving a yellowish-brown solution, which solution may be employed in dyeing. This solution yields a precipitate with either common salt or hydrochloric acid. With concentrated sulfuric acid a brown color is produced. Fabric which has been dyed with the product of this example when subjected to the treatment usual in similar cases with bichromate of potash and acetic acid is not essentially affected in shade or in fastness. The coloring-matter which is on the fiber which has been dyed with the product of this example may be diazotized, and the diazo product so resulting may be treated, as is usual in such operations for developing color on dyed fabric, with an alkaline solution of beta-naphthol, and then the shades become more reddish.

When working with para-mono-nitro-benzyl sulfonic acid or a mixture of this acid and Mohr's dinitro-benzyl sulfonic acid these products in the form of their sodium salts may be employed, weight for weight, in the place of the one (1) part of the sodium salt of Mohr's dinitro-benzyl sulfonic acid of this example. The products so resulting have the properties hereinbefore set forth.

What I claim is—

1. Process of making substantive cotton-coloring matter which consists in treating a hereinbefore-defined nitro-benzyl sulfonic substance with sodium sulfid and sulfur.

2. Process of making substantive cotton-coloring matter which consists in treating the sodium salt of dinitro-benzyl sulfonic acid with sodium sulfid and sulfur.

3. As a new article of manufacture sulfurized substantive cotton-coloring matter which can be obtained by treating a hereinbefore-defined nitro-benzyl sulfonic substance with sodium sulfid and sulfur, whose hereinbefore-defined coloring-matter acid is not dissolved by cold ten (10) per cent. carbonate-of-soda solution and one (1) part of which coloring-matter acid is not wholly dissolved within one (1) hour by ten (10) parts of an aqueous solution of crystallized sodium sulfid, one hundred (100) cubic centimeters of which contain fifty (50) grams of crystallized sodium sulfid, which coloring-matter dyes unmordanted cotton shades which are within the range of brown to yellow, and which shades are not essentially affected by bichromate of potash and acetic acid, and which shades on suitable treatment with nitrous acid and beta-naphthol become reddish.

4. As a new article of manufacture sulfurized substantive cotton-coloring matter which can be obtained by treating the sodium salt of Mohr's dinitro-benzyl sulfonic acid with sodium sulfid and sulfur, whose hereinbefore-defined coloring-matter acid is insoluble in a cold ten (10) per cent. solution of carbonate of soda and one (1) part of which coloring-matter acid is not wholly dissolved within one (1) hour by ten (10) parts of an aqueous solution of crystallized sodium sulfid one hundred (100) cubic centimeters of which contain fifty (50) grams of crystallized sodium sulfid, and which coloring-matter dyes unmordanted cotton a brown shade which shade is practically not affected by bichromate of potash and acetic acid, and which shade on suitable treatment with nitrous acid and beta-naphthol becomes of a reddish cast.

In testimony whereof I have hereunto set my hand in the presence of two subscribing witnesses.

LOUIS HAAS.

Witnesses:
 BERNHARD C. HESSE,
 JACOB ADRIAN.